Patented May 22, 1951

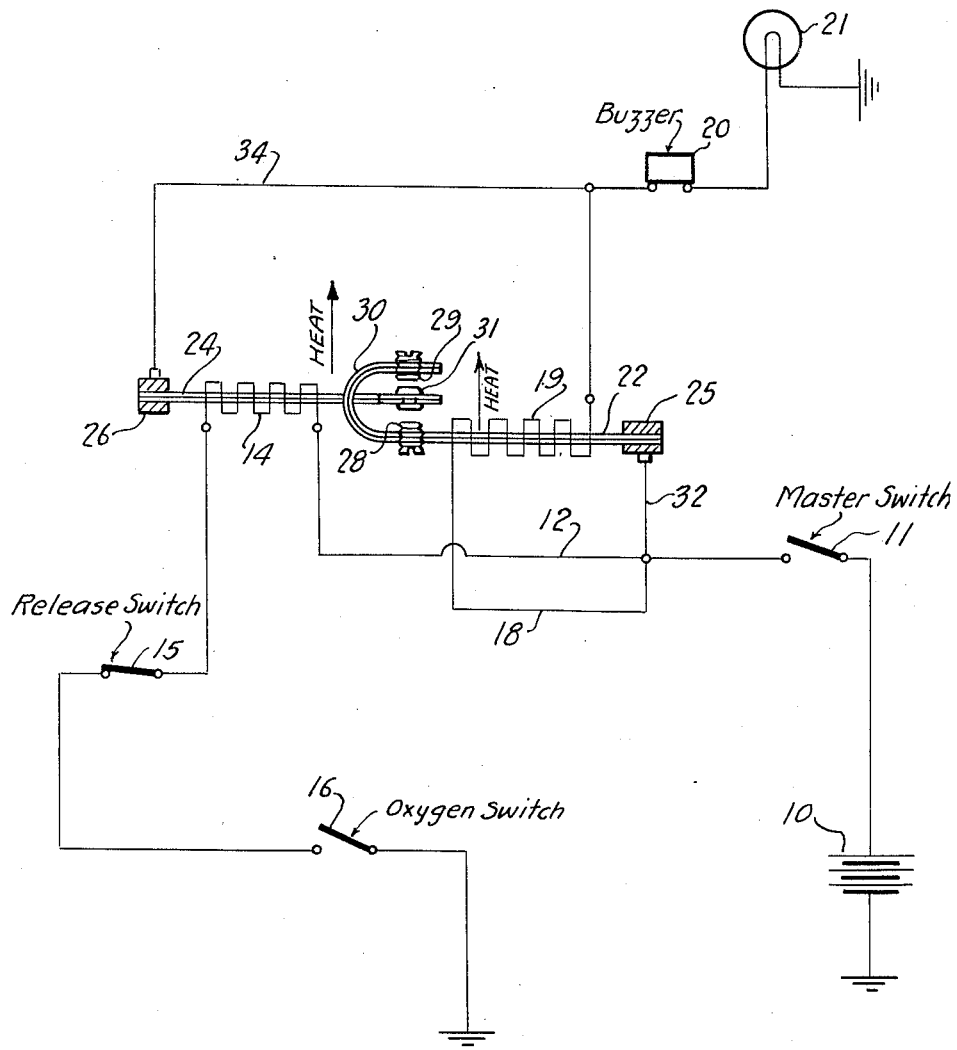

2,553,968

UNITED STATES PATENT OFFICE 2,553,968

ELECTRICAL INDICATOR SYSTEM

Theodore W. Hallerberg, Chicago, Ill.

Application February 6, 1950, Serial No. 142,611

4 Claims. (Cl. 177—311)

This invention relates to an electrical indicator system and, more particularly, to an electrical system for monitoring a periodic or cyclical activity.

My co-pending application Serial No. 734,294, filed March 13, 1947, entitled "Electrical Indicators," now Patent No. 2,519,368, discloses an electrical system designed to give an indication when a certain condition has been changed. However, there are many instances when it is either necessary or desirable to monitor a periodic or cyclical activity in which periodic changes indicate a normal condition. For example, it is a normal condition in an oxygen system for airplanes to have the oxygen alternately flow and cease flowing with the breathing and exhaling of the crew member to whom oxygen is being supplied. Prolonged passage of oxygen may indicate a critical condition, such as a leak or having the entire oxygen system shot out. Likewise, a prolonged period during which no oxygen passes through the system may indicate a critical condition, such as stoppage of the feed tubes or that the crew member has ceased breathing. In order to monitor such a system, it is apparent that there must be some indication to show that the monitoring system is operating properly, one type of signal to indicate normal periodic or intermittent activity, a second type of signal to indicate abnormal cessation of the passage of oxygen, and a third type of signal for the abnormal prolongation of the passage of oxygen. It is further desirable to so arrange these signals so that they all will appear on a single indicator.

It is an object of this invention, therefore, to provide an electrical indicator system for monitoring periodic or cyclical activity.

Another object of this invention is to provide an electrical indicator system for monitoring periodic or cyclical activity, wherein a single indicator signals the normal operation and either of two abnormal conditions.

Another object of this invention is to provide an electrical indicator system for monitoring periodic or cyclical activity, in which distinctly different signals are given for normal operation and for each of two abnormal conditions.

Another object of this invention is to provide an electrical indicator system for monitoring periodic or cyclical activity, wherein a warning indication is given whenever there is a predetermined departure from periodic activity.

Another object of this invention is to provide an electrical indicator system for monitoring periodic or cyclical activity, wherein different signals are given for normal periodic activity, for continuous activity and for the cessation of activity.

Another object of this invention is to provide an electrical indicator system for monitoring periodic or cyclical activity, including a visual indicator device in circuit with a sound device, wherein the visual indicator operates continuously but produces different signals to indicate the normal and the two abnormal conditions, said sound signal device being sounded only upon the occurrence of either of the two abnormal conditions, and then in such a way as to distinguish between these two abnormal conditions.

Other objects and advantages of the present invention will become apparent from the following detailed description thereof when read in conjunction with the accompanying drawing, in which the single figure is a circuit diagram of an electrical indicator system comprising the present invention.

For purposes of illustration the present invention will be described in connection with its specific application to an oxygen feeding system, such as that used on airplanes. In these systems, a number of feed lines lead from a central source or oxygen tank to the oxygen masks worn by the crew members or passengers. When the crew member inhales, oxygen passes through the feed line. When the crew member exhales, the passage of oxygen through the feed line is stopped. Under normal operating conditions, oxygen passes through the feed lines for a slightly shorter period of time than the non-passage period. This cycle may be completed from seven to twenty-five times per minute. Critical or abnormal conditions exist when oxygen passes continuously through the feed lines, or when there is no passage of oxygen through the feed lines for a prolonged period of time.

In the particular embodiment of the present invention disclosed in the accompanying drawing, the power source is a battery 10 grounded on one side and connected upon the other side of two parallel circuits through a master switch 11. The first of the parallel circuits includes a lead line 12 connecting a resistance heating coil 14 with the master switch 11, and a release switch 15 and oxygen switch 16 in series with the coil 14 on its ground side. In the second parallel circuit, a lead 18 connects a resistance heating coil 19 to the master switch 11, the other end of the coil 19 being connected to ground through a buzzer 20 and an indicating lamp 21. A pair of thermally deformable metal members, shown in the drawings as bimetallic elements 22 and 24, are associated with coils 19 and 14, respectively, so as to be heated thereby. In the specific construction shown, the resistance heating coils are formed around the bimetallic members. The bimetallic members 22 and 24 are stationarily mounted at one in members 25 and 26, respectively. A contact 28 is positioned upon the bimetallic element 22, as shown, and a second contact 29 is located upon a bent-back portion 30 of the bimetallic element 22 in such a manner that it is in opposed relationship to contact 28. A double faced contact 31 is mounted upon the end of the bimetallic element 24 in line between contacts 28 and 29. A shunt circuit is thus provided for shorting out coil 19, and includes conductor 32, element 22, element 24, and conductor 34. Whenever contacts 28 and 31 or 29 and 31 are closed, the shunt circuit is completed around coil 19 and the resistance of coil 19 removed from its previous series connection with buzzer 20 and indicating lamp 21.

The operation of the device begins with the closing of the master switch 11, at which time the voltage drops in the parallel circuit including line 18, coil 19, buzzer 20 and lamp 21, are distributed to cause lamp 21 to glow dimly. At the same time, coil 19 heats the element 22 causing it to deflect upwardly. The buzzer 20 is preferably a solenoid type having a movable armature. The voltage drop across this solenoid when coil 19 is in the circuit is such that the movable armature is not moved. Nevertheless, adequate current passes through the buzzer to light the lamp 21. When the coil 19 is short circuited, the voltage at the buzzer is then such as to cause the armature of buzzer 20 to move rapidly and the lamp 21 to glow brightly. The ordinary dull glow in the lamp 21 obtained as soon as the master switch 11 closes indicates that the device is operating.

In the other parallel circuit, the coil 14 is heated periodically when release switch 15 and oxygen switch 16 are both closed, and is cooled when the oxygen switch 16 opens. In the particular apparatus disclosed, the oxygen switch 16 closes during the passage of oxygen through the feed tubes (while the crew member is inhaling) and opens when no oxygen passes through the feed tubes (when the crew member is exhaling).

Under normal conditions, therefore, the oxygen switch 16 remains open a slightly greater period of time than it is closed, and this cycle is repeated from seven to twenty-five times per minute. Consequently, the alternate heating and cooling of the coil 14 will effect a reciprocal movement of the element 24, so that the contact 31 moves back and forth between contacts 28 and 29 without touching either of them. As above noted, the lamp 21 emits a dull glow during this period and the buzzer 20 remains quiet.

If the crew member should stop breathing or the oxygen line become stopped off so that there is a prolonged period during which no oxygen passes through the feed tubes, switch 16 remains open. Consequently, coil 14 becomes completely cooled and the element 24 returns to its normal position shown in the drawing. Since the element 22 is deflected upwardly by the heat of the coil 19, the downward movement of the element 24 causes the contacts 31 and 28 to close, thus closing the shunt circuit 32, 22, 24, 34 and shorting out coil 19. Immediately upon the shorting out of the coil 19, the increased voltage at the buzzer causes the buzzer 20 to operate and the lamp 21 to glow brightly. The coil 19, meanwhile, cools and the element 22 moves downwardly. In a matter of seconds, contacts 31 and 28 have parted and the current once more passes through coil 19 to heat element 22. As a result, the contact 28 once more moves upwardly into contact 31 to close the shunt circuit and to repeat the operation. It is, therefore, apparent that a continued stoppage of oxygen in the feed tubes produces an intermittent buzz in the buzzer 20 and a flashing signal from the lamp 21.

On the other hand, should the oxygen switch remain closed too long due to a leak in the feed lines or complete destruction of the oxygen feed system, the coil 14 heats element 24 to such an extent that contact 31 closes with contact 29. A locking action is immediately effected, since coil 14 remains heated tending to force the contact 31 upwardly, while the coil 19 is short circuited and cooled, thus tending to move the contact 29 downwardly. As a result, the buzzer 20 continuously operates and the lamp 21 emits a continuous bright light.

Since both elements 22 and 24 move in the same direction under influence of heat, it will be apparent that the element 24 must be moved upwardly at a greater rate than element 22 if contact 31 is to close with contact 29. This result may be achieved by making coil 14 hotter (of lower resistance) than coil 19, or by making element 24 more responsive to thermal changes than element 22, or a combination of a hotter coil and a more thermally responsive bimetallic element.

Since contacts 29 and 31 lock as soon as they are closed, a release switch 15 is provided to open the circuit in which coil 14 is positioned in order to cool the coil. Even upon restoration of normal conditions, coil 14 is not sufficiently cooled to lose contact with element 29, so that a release switch or some other suitable device in series with coil 14 must be employed, and re-establishment of normal conditions is thus made a positive and deliberate act.

It is apparent from the above detailed description of the present invention that this invention provides an indicator system, wherein a single indicator may be employed for monitoring periodic or cyclic activity, said indicator providing different signals for normal periodic activity, for continuous activity and for cessation of activity. The present invention also provides a device wherein a sound and a visual signal are combined in series with one another to produce distinctly different signals for a variety of conditions. All elements of the device comprising the present invention take an active part in the operation thereof, and such devices may be produced economically in compact form.

Numerous variations and modifications will become apparent to those skilled in the art from the above detailed description of the present invention. The mounting of the contact 29 upon the bent-back portion 30 of element 22 is advantageous in that the relative positioning of contacts 28, 29 and 31 are unchanged due to ambient temperatures. However, contact 29 may be located upon some other element or means as long as it is correctly positioned as regards contact 31 and is connected electrically to element 22. Where the contact 29 is otherwise mounted than as shown in the drawing and a locking action is not effected when this contact is closed with contact 31, the release switch 15 may be omitted. The use of the buzzer 20 in the manner indicated is believed to be novel and highly advantageous, but lamp 21 may be used alone, if desired.

What I claim is:

1. An electrical indicator system comprising a power source, an indicating device, a condition sensitive device which under normal operating conditions intermittently closes an electrical circuit, means to establish parallel circuits from the power source through the indicating device and through the condition sensitive device respectively, heating coils in each of said circuits, thermally deformable metal members associated with each of said coils and with each other, contacts carried by said metal members, connections established through said metal members and said contacts to short circuit the heating coil in series with the indicating device when said contacts are closed, a third contact connected to the metal member associated with the heating coil in series with the indicating device, said metal members, said contacts carried by said members, and said third contact being so associated that the contacts carried by said metal members are intermittently closed when the circuit including the condition sensitive device is open for a prolonged period of time and the contact on the member associated with the coil in circuit with the condition sensitive device continuously closed with said third contact when that circuit is closed a prolonged period of time.

2. An electrical indicating system as defined in claim 1 wherein the indicating device includes a sound signal element and a visual signal element in series with one another, sufficient current passing through said sound element to operate the visual signal although the sound signal itself only operates when the heating coil in the indicating circuit is short circuited.

3. An electrical indicating system comprising a power source, an indicating device, a condition sensitive device which under normal operating conditions intermittently closes an electrical circuit, means to establish parallel circuits from the power source through the indicating device and through the condition sensitive device, heating coils in each of said circuits, bimetallic elements associated with each of said coils and with each other so as to be deflected in the same direction upon heating, the first of said bimetallic elements having a bent-back portion and a pair of contacts, one mounted upon the bent portion and the other on the body of the bimetallic element in approximately opposed relationship, a contact positioned on the second bimetallic element between the contacts on the first bimetallic element, connections established through said bimetallic elements and said contacts to short circuit the heating coil in series with the indicating device when the contact on the second bimetallic element closes with the contact on the body or with the contact on the bent-back portion of the first bimetallic element, said bimetallic elements and contacts being so associated that the contact on the second bimetallic element and the contact on the body of the first bimetallic element are intermittently closed when the circuit including the condition sensitive device is open for a prolonged period of time, and the contact on the second bimetallic element locks closed with the contact on the bent-back portion of the first bimetallic element when the circuit including the condition sensitive device is closed a prolonged period of time, and means for breaking the circuit through the coil associated with the second bimetallic element to permit that coil to cool and to thus release the locked contacts.

4. An electrical indicating system including a power source, an indicating device, a condition sensitive device which under normal operating conditions intermittently closes an electrical circuit, means to establish a pair of parallel circuits which comprises a first circuit from the power source through the indicating device, and a second circuit from the power source through the condition sensitive device, heating coils in each of said circuits, a bimetallic element associated with and heated by the coil in said first circuit and stationarily mounted at one end and having the other end bent back upon itself, a pair of contacts mounted upon the bimetallic element in approximately opposed spaced relationship by positioning one of said contacts upon the bent-back portion of said element and the other upon the body thereof, a second bimetallic element heated by the heating coil in series with the condition sensitive device and stationarily mounted at one end so as to be deflected upon heating in the same direction as the first element, the heating coil in said circuit and its associated bimetallic element cooperating to provide a deflection of the element upon heating of the coil that is greater than the deflection of the first element produced by heating the coil in said first circuit, said bimetallic elements and contacts carried thereby so positioned that the contacts on the body of the first bimetallic element and on the second bimetallic element are intermittently closed only when said second circuit is open beyond a predetermined time and the contact on the bent portion of the first bimetallic element and the other side of the contact of the second bimetallic element are locked closed only when said second circuit is closed more than a predetermined time.

THEODORE W. HALLERBERG.

REFERENCES CITED

The following references are of record in the file of this patent:

UNITED STATES PATENTS

| Number | Name | Date |
| --- | --- | --- |
| 2,435,181 | Lindsay | Jan. 27, 1948 |
| 2,450,450 | Schmidinger | Oct. 5, 1948 |